United States Patent [19]

Kishi et al.

[11] Patent Number: 4,501,012
[45] Date of Patent: Feb. 19, 1985

[54] SPEECH RECOGNITION SYSTEM FOR AN AUTOMOTIVE VEHICLE

[75] Inventors: Norimasa Kishi; Kazunori Noso, both of Yokosuka, Japan

[73] Assignee: Nissan Motor Company, Limited, Japan

[21] Appl. No.: 379,506

[22] Filed: May 18, 1982

[30] Foreign Application Priority Data

Nov. 17, 1980 [JP] Japan ................................ 55-161605
Nov. 21, 1980 [JP] Japan ................................ 55-164359

[51] Int. Cl.³ .......................... G10L 1/00; E05B 49/00
[52] U.S. Cl. ..................................................... 381/43
[58] Field of Search ................................ 381/41–43; 364/513, 513.5, 424, 426, 440; 180/170, 179, 281; 367/198; 340/52 F

[56] References Cited

U.S. PATENT DOCUMENTS

| | | | |
|---|---|---|---|
| 3,765,502 | 10/1973 | Mark | 180/281 |
| 4,039,782 | 8/1977 | Burkhardt et al. | 364/424 |
| 4,087,630 | 5/1978 | Browning et al. | 179/1 SD |
| 4,138,723 | 2/1979 | Nehmer | 364/424 |
| 4,450,545 | 5/1984 | Kishi et al. | 381/42 |

Primary Examiner—E. S. Matt Kemeny
Attorney, Agent, or Firm—Lowe, King, Price & Becker

[57] ABSTRACT

A speech recognition system for an automotive vehicle which can selectively activate actuators according to vehicle-travelling conditions in such a way that a spoken instruction such as "Door open" or "Trunk lid open" can be recognized only when vehicle speed is zero, "Headlight high/low beam" can be recognized only when vehicle speed reaches a predetermined value, and "Air conditioner on/off" or "Radio on/off" can be recognized regardless of vehicle speed. The speech recognition system for an automotive vehicle according to the present invention comprises a speed sensor or the like and a speed-dependent speech selection unit including AND gates or analog switches, in addition to the conventional speech recognizer.

14 Claims, 8 Drawing Figures

SPEECH RECOGNITION SYSTEM FOR AN AUTOMOTIVE VEHICLE

BACKGROUND OF THE INVENTION

1. Field of the Invention

The present invention relates generally to a speech recognition system for an automotive vehicle, and more particularly to a speech recognition system by which a plurality of predetermined spoken instructions are selectively recognized according to vehicle-travelling conditions.

2. Description of the Prior Art

Conventionally, there is well known a speech recognizer which can activate various actuators in response to human spoken instructions. When this speech recognizer is mounted on a vehicle, the headlight, for instance, can be turned on or off by the driver's spoken instruction such as "Headlight on" or "Headlight off". Such a speech recognizer usually can recognize various spoken instructions in order to control various actuators; however, there are some problems involved in applying this system to an automotive vehicle. In the case where the speech recognizer is so designed as to activate a dooropening mechanism in response to the driver's spoken instruction, for example, "Door open", if some passengers have a conversation including the phrase "Door open" while the vehicle is travelling, a dangerous situation may occur in that all the vehicle doors will open while the vehicle is travelling at high speed. Therefore, generally, there is provided a recognition switch which allows spoken instructions to be inputted to the speech recognizer only while this switch is depressed; even so, from the standpoint of safety spoken phrase such as "Door open" should not be recognized by the speech recognizer at all while the vehicle is travelling. On the other hand, there are some spoken instructions, for instance, such as "Headlight high-beam" which are usually used only while the vehicle is travelling and, of course, there are many spoken instructions such as "Air conditioner on/off", "Radio on/off", "Channel 3" etc., which are used regardless of vehicle's travelling conditions.

Furthermore, from the standpoint of improvement in recognition performance, it is desirable to reduce the number of spoken instructions.

A more detailed description of a typical speech recognizer will be made with reference to the attached drawing in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle by which a plurality of actuators for conducting some necessary functions in an automotive vehicle can selectively be activated according to vehicle-travelling conditions, in such a way that a spoken instruction such as "Door open" is recognized only when vehicle speed is zero, "Headlight high-beam" is recognized only when vehicle speed reaches a fixed rate, and "Air conditioner on" is recognized regardless of vehicle speed.

To achieve the above-mentioned object, the speech recognition system for an automotive vehicle according to the present invention comprises a speed sensor or the substitutes such as ignition switch sensor or shiftgear drive/neutral position sensor, and a speed-dependent speech selection unit including a plurality of AND gates or analog switches, in addition to the conventional speech recognizer.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
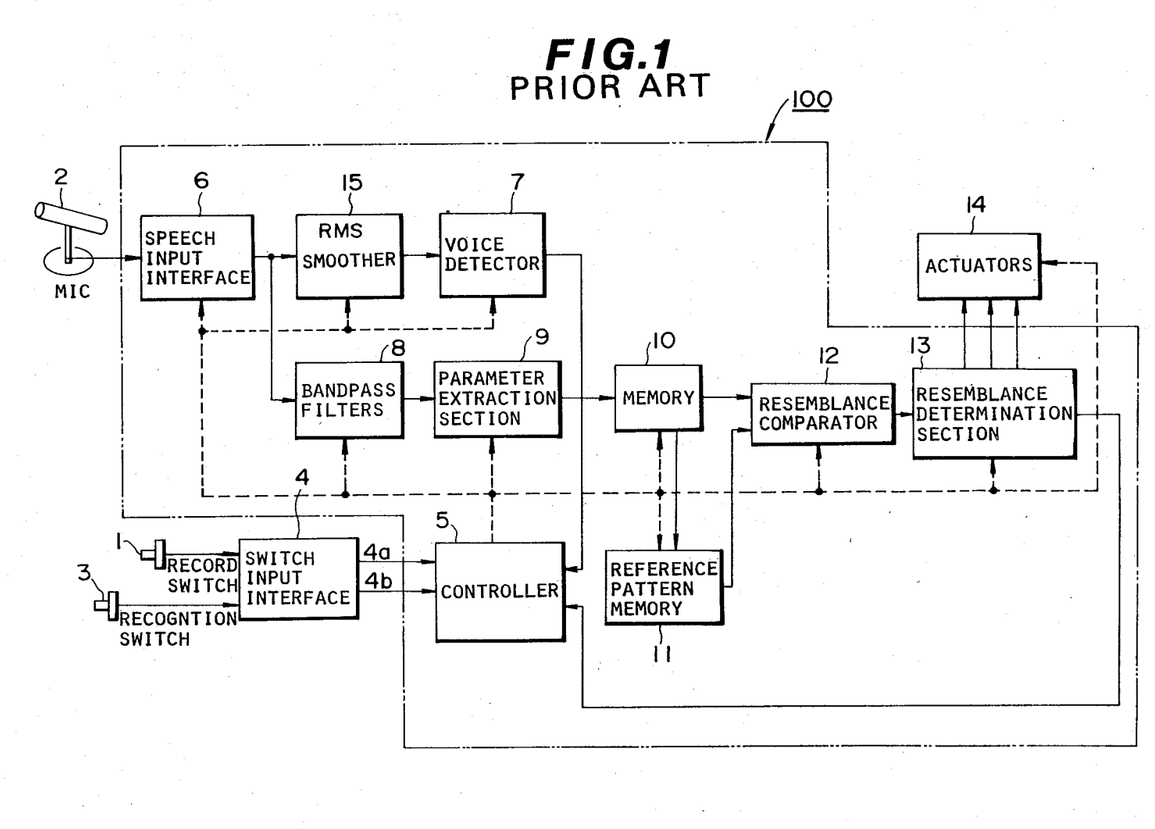
FIG. 1 is a schematic block diagram of a typical speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections for presetting the entire speech recognizer in the recording mode. In the spoken instruction recording mode, when the user says a phrase to be used as a spoken instruction, such as "open doors", near a microphone 2, the spoken phrase is transduced into corresponding electric signals through the microphone 2, amplified through a speech input interface 6, smoothed through a root-square (RMS) smoother 15, and finally inputted to a voice detector 7. This voice detector 7 detects whether or not the magnitude of the spoken phrase signals exceeds a predetermined level for a predetermined period of time (150 to 250 ms) in order to determine the start of the spoken phrase input signals and whether or not the magnitude of the signals drops below a predetermined level for a predetermined period of time in order to determine the end of the signals. Upon detection of the start of the signals, this voice detector 7 outputs another recording mode command signal to the controller 5. In response to this command signal, the controller 5 activates a group of bandpass filters 8, so that the spoken phrase signals from the microphone 2 are divided into a number of predetermined frequency bands. Given to a parameter extraction section 9, the frequency-divided spoken phrase signals are squared or rectified therein in order to obtain the voice power spectrum for each of the frequency bands and then converted into corresponding digital time-series matrix-phonetic pattern data. These data are next stored into a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for recognizing the speech instructions.

After having recorded the reference spoken instructions, the user can input speech instructions, for instance, such as "open doors", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections for presetting the entire speech recognizer in the recognition mode. In such spoken phrase recognition mode, when the user says an instruction phrase similar to the one recorded previously near the microphone 2 and when the voice detector 7 outputs a signal, the spoken instruction is transduced into corresponding electric signals through the microphone 2, amplified through the speech input interface 6, filtered and divided into voice power spectrum for each of the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the resemblance rate of the inputted speech instruction to the reference speech instruction after time normalization and level normalization for compensating for variable speaking rate (because the same person speaks fast and loudly at one time but slow and whisperingly at the other time). The resemblance rate is usually obtained by calculating Tchebycheff distance between recognition-mode time-series matrix-phonetic pattern data and recording-mode time-series matrix-phonetic pattern data. The resemblance rate calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction having adequate resemblance to one of the recorded instruction phrases, is outputted to one of actuators 14, for instance, in order to open the vehicle doors. Further, the above-mentioned operations are all executed in accordance with command signals outputted from the controller 5.

Description has been made hereinabove of the case where various discrete elements or sections are used for the speech recognizer 100; however, it is of course possible to realize the speech recognizer 100 by the use of a microcomputer including a central processing unit, a read-only memory, a random-access memory, a clock oscillator, etc. In such case, the voice detector 7, the parameter extraction section 9, the memory 10, the reference pattern memory 11, the resemblance comparator 12 and the resemblance determination section 13 can be all incorporated within the microcomputer, executing the same or similar processing, calculation or operations as already explained hereinabove.

Additionally, the Tchebycheff distance is defined as follows:

In the case where the number of the bandpass filters is four and the number of time-series data for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and j denotes time-series data index.

Here, if a first recognition-mode speech instruction (e.g. OPEN DOORS) is indicated as B, the Tchebycheff distance can be obtained from the following expression:

$$l = |F(A) - F(B)| = \sum_{i=1}^{4} \sum_{j=1}^{32} |f^A(i,j) - f^B(i,j)|$$

In views of the above description and with reference to the attached drawings, the embodiments of the speech recognition system for an automotive vehicle according to the present invention will be described hereinbelow.

Figure 2:
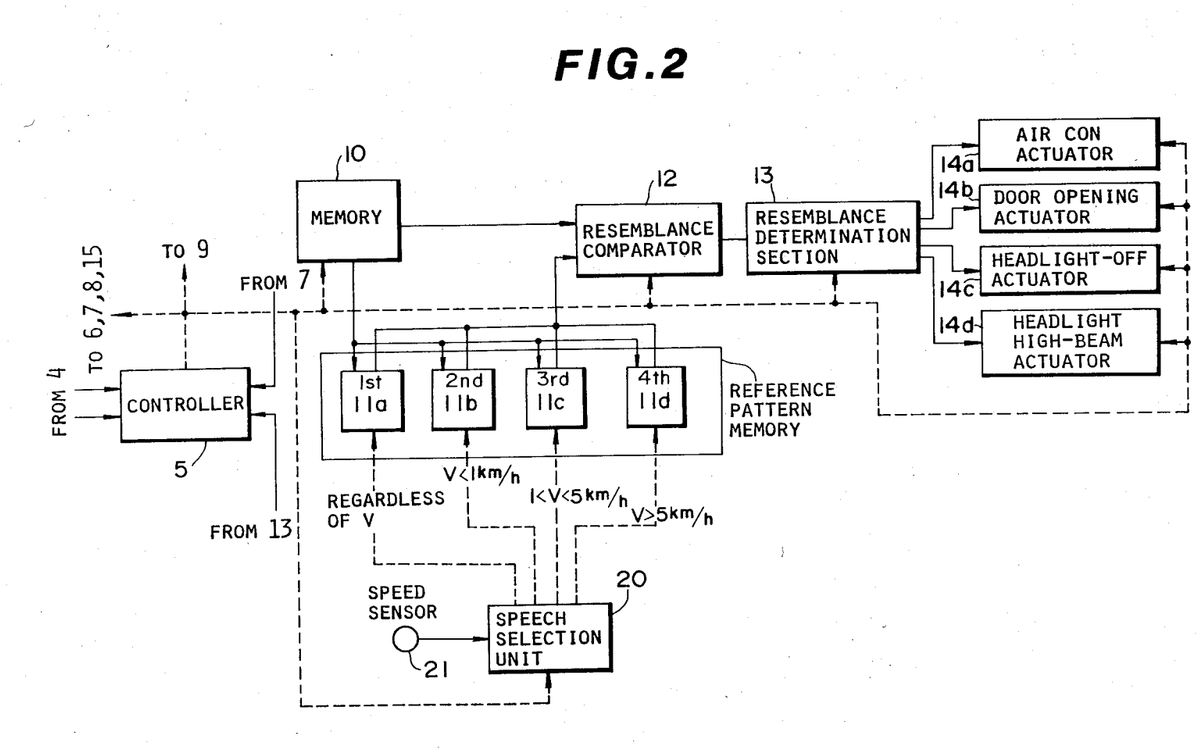
FIG. 2 is a fragmentary schematic block diagram of a first embodiment of the speech recognition system for an automotive vehicle according to the present invention.

FIG. 2 shows a fragmentary schematic block diagram of a first embodiment of the speech recognition system according to the present invention.

In the figure, the reference numeral 20 denotes a speed-dependent speech selection unit for enabling or suppressing the reference matrix-phonetic pattern data according to vehicle speed and the reference numeral 21 denotes a vehicle sensor for electrically, magnetically or optically detecting vehicle speed and outputting digital signals corresponding thereto. Furthermore, in this embodiment, the reference pattern memory 11 includes a plurality of reference pattern memory units 11a, 11b, 11c, and 11d one for each instruction phrase. For instance, the time-series matrix-phonetic pattern data corresponding to "Air conditioner on" are stored in the unit 11a.

In brief summation of this embodiment, the command signal from the controller 5 is selectively applied to the respective reference pattern memory units 11a to 11d via the speech selection unit 20 according to the detected vehicle speed in order to control the speech recognition functions of the speech recognition system.

Figure 3:
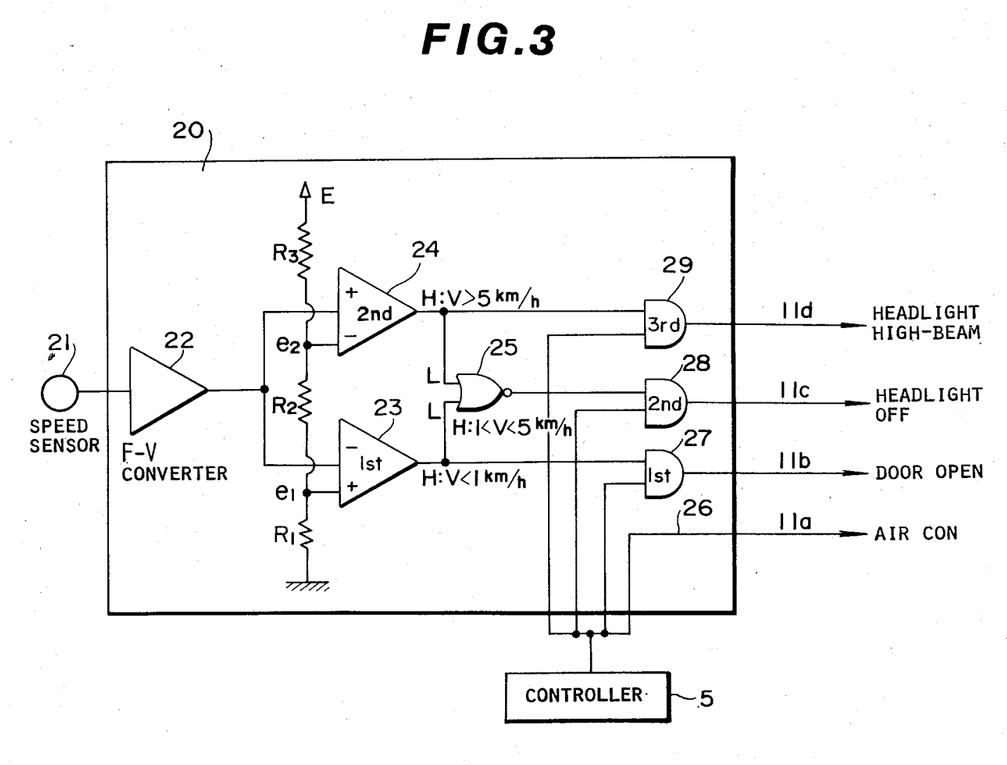
FIG. 3 is a circuit diagram of a first embodiment of a speed-dependent speech selection unit for use in the speech recognition system for an automotive vehicle according to the present invention.

FIG. 3 shows a first embodiment of the circuit configuration of the speech selection unit 20. In the figure, the reference numeral 22 denotes a frequency-voltage converter (f-V converter) for converting digital pulse signals from the vehicle sensor 21 into the corresponding analog voltage signals. The reference numerals 23 and 24 denote two comparators. The plus input terminal of the first comparator 23 is connected to an intermediate point of serially-connected voltage division resistors to receive a reference voltage $e_1$ and the minus input terminal of the first comparator 23 is connected to the F-V converter 22. On the other hand, the plus input terminal of the second comparator 24 is connected to the F-V converter 22 and the minus input terminal of the second comparator 24 is connected to another intermediate point of serially-connected voltage division resistors to receive another reference voltage $e_2$. The reference numeral 25 denotes a NOR gate, two input terminals of which are connected to the output terminals of the comparators 23 and 24, respectively. The reference numerals 27, 28 and 29 denote three AND gates, one of the two input terminals of each of which is connected to the output terminal of one of the comparators 23 or 24 or the NOR gate 25 and the other of two input terminals of all of which is connected to the controller 5. Further, the reference numeral 26 denotes a wire for directly connecting the first reference pattern memory unit 11a to the controller 5.

Now, follows the operation of this speech selection unit. Since the frequency of the pulse signals detected by the speed sensor 21 is proportional to vehicle speed, it is possible to obtain analog voltages, the level of which is proportional to the vehicle speeds by converting the pulse signals into the corresponding voltage signals via the F-V converter 22. These voltage signals are next compared with two reference voltages $e_1$ and $e_2$ by the two comparators 23 and 24, respectively. A first reference voltage $e_1$ corresponding to a vehicle speed of, for instance, 1 km/h can be determined by $E(R_1/R_1+R_2+R_3)$; while a second reference voltage $e_2$ corresponding to a vehicle speed of, for instance, 5 km/h can be determined by $E(R_1+R_2/R_1+R_2+R_3)$. Therefore, when vehicle speed drops below 1 km/h, the first comparator 23 outputs a H-voltage level signal; when vehicle speed rises beyond 5 km/h, the second comparator 24 outputs a H-voltage level signal; when vehicle speed lies between 1 to 5 km/h, the NOR gate 25 outputs a H-voltage level signal.

On the other hand, when a spoken instruction is inputted to the speech recognition system in the recognition mode, since the controller 5 always outputs a H-voltage level command signal to the speech selection unit 20, this command signal is applied from the controller 5 to one of the input terminals of the respective AND gates 27, 28 and 29. Therefore, in response to the command signal, one of the AND gates 27, 28 or 29 associated with the current vehicle speed will outputs a H-voltage level signal, so that the time-series matrix-phonetic pattern data stored in the respective reference pattern memory unit 11a, and one of 11b, 11c and 11d are transferred to the resemblance comparator 12 for comparison of the reference pattern data with those of an inputted spoken instruction.

After the resemblance rate is calculated by the comparator 12, the actuator corresponding thereto is activated in response to the signal from the resemblance determination section 13.

To explain more concretely, since spoken instructions such as "Air conditioner on", "Radio on" and "Channel 1" are stored in the first reference pattern memory unit 11(a), these instructions can be transferred to the resemblance comparator 12 regardless of the vehicle speed. Further, since spoken instructions such as "Door open" and "Trunk lid open" are stored in the second reference pattern memory unit 11b, these instructions can be transferred only when the vehicle speed is less than 1 km/h. Further, since spoken instructions such as "Headlight off" are stored in the third reference memory unit 11c, these instructions can be transferred only while the vehicle is moving at a speed between 1 and 5 km/h. Finally, since spoken instructions such as "Headlight highbeam" are stored in the fourth reference pattern memory unit 11d, these instructions can be transferred only while the vehicle is moving at a speed of more than 5 km/h.

In this embodiment, an analog signal representative of vehicle speed is compared with reference analog signals; however, it is of course possible to compare a digital signal representative of vehicle speed with the reference digital signal to eliminate the need for the F-V converter 22. In this case, the number of pulses counted in a predetermined period of time would be directly compared with a reference value.

Figure 4:
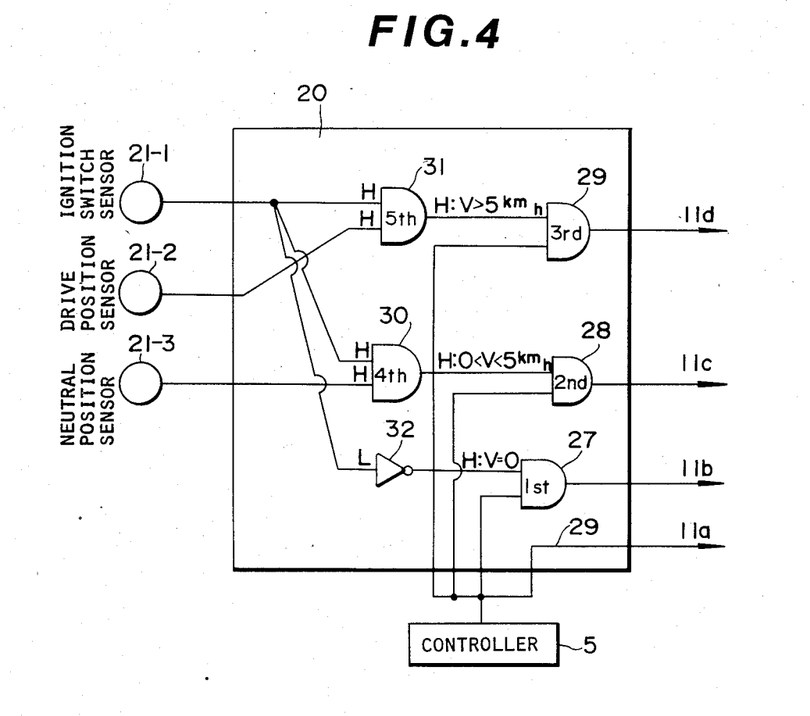
FIG. 4 is a circuit diagram of a second embodiment of a speed-dependent speech selection unit for use in the speech recognition system for an automotive vehicle according to the present invention.

FIG. 4 shows a second embodiment of the circuit configuration of the speech selection unit 20. In the figure, the reference numeral 21-1 denotes an ignition switch sensor for outputting a H-voltage level signal when an ignition switch is turned on, the reference numeral 21-2 denotes a drive position sensor for outputting a H-voltage level signal when the gear shift of a transmission system is shifted into any of the 1st DRIVE, 2nd DRIVE, and REAR positions, that is, when the vehicle is travelling frontward or backward; the reference numeral 21-3 denotes a neutral position sensor for outputting a H-voltage level signal when the gear shift is in NEUTRAL position. The reference numerals 30 and 31 denote a fourth AND gate and a fifth AND gate, respectively. The reference numeral 32 denotes an inverter.

Two input terminals of the fourth AND gate 30 are connected to the ignition switch sensor 21-1 and the neutral position sensor 21-3, respectively. Therefore, when the ignition switch is turned on and further the gear shift is shifted into the neutral position, since two input terminals of the fourth AND gate 30 are both at a H-voltage level, the fourth AND gate 30 outputs a H-voltage level signal indicating that the vehicle is travelling at a speed less than, for instance, five km/hour.

Two input terminals of the fifth AND gate 31 are connected to the ignition switch sensor 21-1 and the drive position sensor 21-2. Therefore, when the ignition switch is turned on and the gear shift is in the drive position, since two input terminals of the fifth AND gate 31 are both at a H-voltage level, the fifth AND gate 31 outputs a H-voltage level signal indicating that the vehicle is travelling at a speed of more than, for instance, five km/hour.

The input terminal of the inverter 32 is connected to the ignition switch sensor 21-2. Therefore, when the ignition switch is turned off, the output terminal of the inverter 32 is at a H-voltage level signal indicating that the vehicle speed is zero.

The operation of the AND gates 27, 28, and 29 is the same as in FIG. 3, and therefore the description thereof will be omitted.

Figure 5:
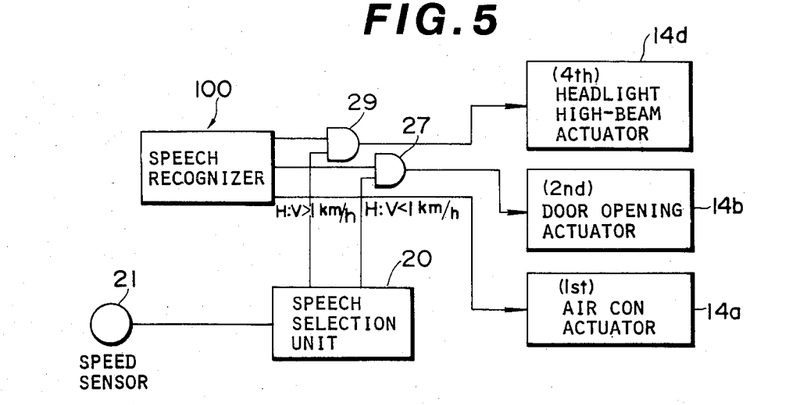
FIG. 5 is a schematic block diagram of a second embodiment of the speech recognition system for an automotive vehicle according to the present invention.

FIG. 5 shows a schematic block diagram of a second embodiment according to the present invention. In this embodiment, the speed-dependent speech selection unit 20 including a first AND gate 27 and a third AND gate 29 is connected between the speech recognizer 100 and a plurality of vehicle actuators 14. That is to say, the vehicle speed is sensed by the speed sensor 21 and the sensed vehicle speeds are classified into appropriate groups (in this embodiment, more or less than one meter per second) by the speech selection unit 20. Therefore, only when the vehicle speed is less than one meter per second, actuator 14b for opening vehicle doors can be activated through the AND gate 27; only when the vehicle speed is more than one meter per second, the actuator 14d for switching headlights into the high-beam condition can be activated through the AND gate 29; the actuator 14a for turning on an air conditioner can be activated, regardless of the vehicle speed.

Figure 6:
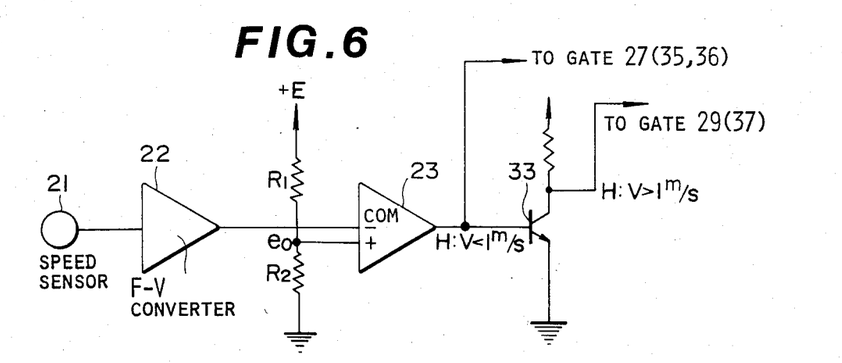
FIG. 6 is a circuit diagram of a third embodiment of a speed-dependent speech selection unit for use in the speech recognition system for an automotive vehicle according to the present invention.

FIG. 6 shows a first embodiment of the circuit configuration of the speed-dependent speech selection unit 20 excluding the AND gates 27 and 29. In the figure, the reference numeral 21 denotes a speed sensor for detecting vehicle speeds in the form of pulse signals the number of pulse signals per unit time of which is proportional to vehicle speed. The reference numeral 22 denotes a frequency-voltage converter for converting the detected pulse signals from the vehicle sensor 21 into the corresponding voltage signals. The reference numeral 23 denotes a comparator, the minus input terminal of which is connected to the F-V converter 22 and the plus input terminal of which is connected to the point of junction of two serially-connected voltage division resistors $R_1$ and $R_2$ in order to receive a reference voltage. The reference numeral 33 denotes a transistor serving as an inverter. Returning to FIG. 5, the reference numeral 27 and 29 denote two AND gates one input terminal of each of which is connected to the speech recognizer 100 and the respective other input terminal of each of which is connected to the comparator 23 or the transistor 33, respectively.

Now, follows the operation of this speech selection unit. Since the frequency of the pulse signals from the speed sensor 21 is proportional to vehicle speed, a voltage proportional to vehicle speed is outputted by the F-V converter 22. The voltage signal is next compared with the reference voltage $e_0$ by the comparator 23. The reference voltage $e_0$ corresponding to a vehicle speed of, for instance, one meter per second can be determined by $E(R_2/R_1+R_2)$. Therefore, when vehicle speed is less than one meter per second, the comparator 23 outputs a H-voltage level signal to one input terminal of the AND gate 27.

On the other hand, when a correct spoken instruction is inputted to the speech recognizer 100 in recognition mode, the recognizer 100 outputs a H-voltage level command signal to the AND gate 27 in response thereto. Therefore, an ANDed output signal is given to the second actuator 14b to drive, for instance, a mechanism to open the vehicle doors. Also, in this case, since the transistor 33 is on, the collector terminal thereof is at a L-voltage level, so that the AND gate 29 is not activated.

Similarly, when vehicle speed is more than one meter per second, since the comparator 23 outputs a L-voltage level signal, the transistor 33 will be off, therefore the collector terminal thereof will be at a H-voltage level. Thus, when a command signal is applied to the AND gate 29, it outputs an activating signal to the fourth actuator 14d to drive, for instance, a dimmer switch to switch a headlight into high-beam condition.

In addition, as shown in FIG. 5, since the first actuator 14a for driving, for instance, a switch to operate an air conditioner is directly connected to the speech recognizer 100, the first actuator 14a can be activated regardless of the vehicle speed.

Figure 7:
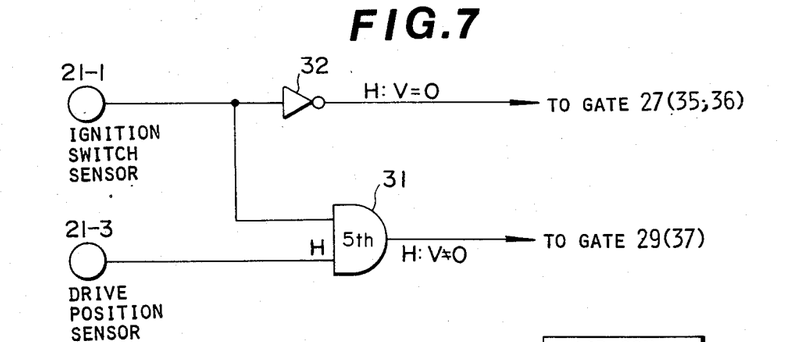
FIG. 7 is a circuit diagram of a fourth embodiment of a speed-dependent speech selection unit for use in the speech recognition system for an automotive vehicle according to the present invention.

FIG. 7 shows a second embodiment of the circuit configuration of the speech selection unit 20 excluding the AND gates 27 and 29. In the figure, the reference numeral 21-1 denotes an ignition switch sensor which outputs a H-voltage level signal when an ignition switch is turned on and a L-voltage level signal when turned off. The reference numeral 21-3 denotes a drive position sensor which outputs a H-voltage level signal when the gear shift of a transmission system is in any of the 1st DRIVE, 2nd DRIVE, and REVERSE positions, that is, when the vehicle is travelling frontward or backward and a L-voltage level signal when the gear shift is in any of the above.

The reference numeral 32 denotes an inverter and 31 denotes a fifth AND gate.

Since the input terminal of the inverter 32 is connected to the ignition switch sensor 21-1, when the ignition switch is turned off, the output terminal thereof is at a H-voltage level indicating that the vehicle speed is zero.

Since the two input terminals of the AND gate 31 are connected to the ignition switch sensor 21-1 and the drive position sensor 21-3, when the ignition switch is turned on and the gear shift is in one of the driving positions, the AND gate 31 outputs a H-voltage level signal indicating that the vehicle is travelling.

The operations of the AND gates 27 and 29 are the same as in FIG. 5, therefore the description thereof will be omitted.

Figure 8:
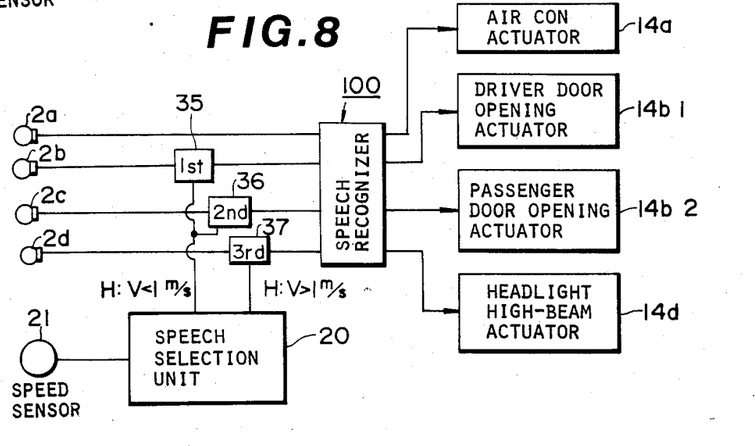
FIG. 8 is a schematic block diagram of a third embodiment of the speech recognition system for an automotive vehicle according to the present invention.

FIG. 8 shows a schematic block diagram of a third embodiment according to the present invention. In this embodiment, the speed-dependent speech selection unit 20 including three analog switches is connected between a plurality of microphones and the speech recognizer 100. In the figure, the reference numerals 2a, 2b, 2c and 2d denote a plurality of microphones through which a plurality of spoken instructions are inputted in recognition mode to the speech recognizer 100. The reference numerals 35, 36 and 37 denote analog switches which connect or disconnect the spoken instruction signals to or from the speech recognizer 100 in response to signals from the speech selection unit 20, such as is shown in FIG. 6.

Since a H-voltage level signal indicating that vehicle speed is less than one meter per second is applied from the comparator 23 (shown in FIG. 6) to the analog switches 35 and 36, only when the vehicle speed is less than one meter per second, the analog switches 35 and 36 are closed, so that a specific set of spoken instructions, for instance, such as "Driver-side door open", can be inputted to the speech recognizer through the microphone 2b disposed on the inside surface of a driver-side door and similarly a different spoken instruction, for instance, such as "Passenger-side door open", can be inputted to the speech recognizer through the microphone 2c disposed on the inside surface of a passenger-side door.

On the other hand, since a H-voltage level signal indicating that the vehicle speed is more than one meter per second is inputted from the collector of the transistor 33 (shown in FIG. 6) to the analog switch 37, only when the vehicle speed is more than one meter per second, the analog switch 37 is closed, so that a spoken instruction, for instance, such as "Headlight high-beam", can be inputted to the speech recognizer 100 through the microphone 2d disposed at the central portion of a steering wheel.

Since the microphone 2a is directly connected to the speech recognizer 100, a spoken instruction, for instance, such as "Air conditioner on", can be inputted to the speech recognizer 100 regardless of vehicle speed.

Although various embodiments of the speed-dependent speech selection units has been described hereinabove by using various discrete elements or sections, it is of course possible to incorporate the same functions within the microcomputer of the speech recognizer 100 as already explained.

As described above, in the speech recognition system for an automotive vehicle according to the present invention, a plurality of vehicle actuators for conducting some necessary functions in an automotive vehicle can selectively be activated according to vehicle speed. Thus it is possible to reduce the number of reference matrix-phonetic pattern data for each classified vehicle speed, thus improving reliability of recognition performance. Furthermore, it is possible to avert dangerous conditions, such as the vehicle doors opening while the vehicle is travelling, thus allowing more safe operation.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A speech recognition system for an automotive vehicle for outputting a plurality of command signals to a plurality of vehicle actuators independently in accordance with spoken instructions, which comprises:
 (a) at least one microphone for transducing spoken instructions into corresponding electric signals and outputting signals corresponding thereto;
 (b) a speech recognizer including a parameter extraction section, at least one reference pattern memory unit, a resemblance comparator, a resemblance determination section, and a controller, said speech recognizer being connected to said at least one microphone for extracting time-series matrix-phonetic pattern data from the transduced spoken instruction signals by said parameter extraction section, sequentially comparing the extracted matrix-phonetic pattern data with the reference matrix-phonetic pattern data of a plurality of reference spoken instructions previously stored in said reference pattern memory unit by said resemblance comparator in order to obtain resemblance rates of the extracted pattern data to the reference pattern data, and outputting a command signal corresponding to the transduced spoken instruction signals to one of the actuators when one of the obtained resemblance rates lies within a predetermined range in said resemblance determination section, all the mutual operations within said speech recognizer being executed in accordance with command signals outputted from said controller,
 (c) at least one means for detecting vehicle-travelling conditions and outputting signals corresponding thereto; and
 (d) a speed-dependent speech selection unit connected to both said speech recognizer and said vehicle-travelling condition detecting means for selectively allowing said speech recognizer to activate some of the actuators, according to the detected vehicle-travelling conditions, in response to the spoken instructions corresponding to the actuators,
whereby it is possible to prevent actuator operations due to said speech recognizer which would be inappropriate for the current vehicle speed.

2. A speech recognition system for an automotive vehicle for outputting a plurality of command signals to a plurality of vehicle actuators independently in accordance with spoken instructions as set forth in claim 1, wherein said speed-dependent speech selection unit is connected between said controller and a plurality of said reference pattern memory units storing a plurality of reference time-series matrix-phonetic pattern data independently for allowing a command signal to pass from said controller to said respective reference pattern memory units therethrough, according to vehicle-travelling conditions, to transfer the respective reference matrix-phonetic pattern data to said resemblance comparator.

3. A speech recognition system for an automotive vehicle for outputting a plurality of command signals to a plurality of vehicle actuators independently in accordance with spoken instructions as set forth in claim 1, wherein said speed-dependent speech selection unit is connected between said speech recognizer and a plurality of the actuators for allowing a command signal to pass from said speech recognizer to said respective actuator therethrough, according to vehicle-travelling conditions, to activate the respective actuator.

4. A speech recognition system for an automotive vehicle for outputting a plurality of command signals to a plurality of vehicle actuators independently in accordance with spoken instructions as set forth in claim 1, wherein said speed-dependent speech selection unit is connected between said at least one microphone and said speech recognizer for allowing signals transduced by said microphone to pass to said speech recognizer therethrough, according to vehicle-travelling conditions, to activate the respective actuator.

5. A speech recognition system for an automotive vehicle for outputting a plurality of command signals to a plurality of vehicle actuators independently in accordance with spoken word instructions as set forth in claim 2, wherein said vehicle-travelling condition detecting means is a speed sensor for generating pulse signals, the frequency of which is proportional to vehicle speed, and said speed-dependent speech selection unit comprises:
 (a) a frequency-voltage converter connected to said speed sensor for converting the pulse frequency from said speed sensor into a voltage signal representative of vehicle speed and outputting signals corresponding thereto;
 (b) a first comparator, the minus input terminal of which is connected to said f-V converter and to the plus input terminal of which a lower reference voltage indicative of a lower refrence vehicle speed is applied, said first comparator comparing the two input signals and outputting a H-voltage level signal when the voltage signal from said f-V converter drops below the lower reference voltage;

(c) a second comparator, the plus input terminal of which is connected to said f-V converter and to the minus input terminal of which a higher reference voltage indicative of a higher reference vehicle speed is applied, said second comparator comparing the two input signals and outputting a H-voltage level signal when the voltage signal from said f-V converter exceeds the higher reference voltage;

(d) a NOR gate, two input terminals of which are connected to said first and second comparators for NORing the two input signals and outputting a H-voltage level signal when the voltage signal from said f-V converter lies between the higher and lower reference voltages;

(e) said controller being directly connected to said first reference pattern memory unit to transfer the reference matrix-phonetic pattern data in said first reference pattern memory unit to said resemblance comparator, regardless of vehicle speed, said controller outputting a H-voltage level signal when any one of the spoken instructions is inputted to said microphone;

(f) a first AND gate, one input terminal of which is connected to said first comparator and the other input terminal of which is connected to said controller for ANDing the two input signals and outputting a H-voltage level signal to said second reference pattern memory unit to transfer the reference matrix-phonetic pattern data in said second reference pattern memory unit to said resemblance comparator when both said first comparator and said controller output a H-voltage level signal, respectively, that is, when vehicle speed drops below the lower reference vehicle speed and any one of the spoken instructions is inputted to said microphone;

(g) a second AND gate, one input terminal of which is connected to said NOR gate and the other input terminal of which is connected to said controller for ANDing the two input signals and outputting a H-voltage level signal to said third reference pattern memory unit to transfer the reference matrix-phonetic pattern data in said third reference pattern memory unit to said resemblance comparator when both said NOR gate and said controller output a high-voltage level signal, respectively, that is, when vehicle speed lies between the lower and higher reference vehicle speed and any one of the spoken instructions is inputted to said microphone; and (h) a third AND gate, one input terminal of which is connected to said second comparator and the other input terminal of which is connected to said controller for ANDing the two input signals and outputting a H-voltage level signal to said fourth reference pattern memory unit to transfer the reference matrix-phonetic pattern data in said fourth pattern memory unit to said resemblance comparator when said second comparator and said controller output a H-voltage level signal, respectively, that is, when vehicle speed rises beyond the higher reference vehicle speed and any one of the spoken instructions is inputted to said microphone.

6. A speech recognition system for an automotive vehicle for outputting a plurality of command signals to a plurality of vehicle actuators independently in accordance with spoken instructions as set forth in claim 2, wherein one said vehicle-travelling condition detecting means include an ignition switch sensor for outputting a H-voltage level signal when an ignition switch is turned on, a drive position sensor for outputting a H-voltage level signal when a transmission system is shifted into any of 1st DRIVE, 2nd DRIVE and REVERSE positions, and a neutral position sensor for outputting a H-voltage level signal when a transmission system is shifted into NEUTRAL position, and said speed-dependent speech selection unit comprises:

(a) an inverter, input terminal of which is connected to said ignition switch sensor for inverting the input signal and outputting a H-voltage level signal when the ignition switch is turned off;

(b) a fourth AND gate, one input terminal of which is connected to said ignition switch sensor and the other input terminal of which is connected to said neutral position sensor for ANDing the two input signals and for outputting a H-voltage level signal when the ignition switch is turned on and the transmission system is shifted into the NEUTRAL position;

(c) a fifth AND gate, one input terminal of which is connected to said ignition switch sensor and the other input terminal of which is connected to said drive position sensor for ANDing the two input signals and outputting a H-voltage level signal when the ignition switch is turned on and the transmission system is shifted into any of 1st DRIVE, 2nd DRIVE and REVERSE positions;

(d) said controller being directly connected to said first reference pattern memory unit to transfer the reference matrix-phonetic pattern data in said first reference pattern memory unit to said resemblance comparator, regardless of vehicle speed, said controller outputting a H-voltage level signal when any one of the spoken instructions is inputted to said microphone;

(e) a first AND gate, one input terminal of which is connected to said inverter and the other input terminal of which is to said controller for ANDing the two input signals and outputting a H-voltage level signal to said second reference pattern memory unit to transfer the reference matrix-phonetic pattern data in said second reference pattern memory unit to said resemblance comparator when said inverter and said controller output a H-voltage level signal, respectively, that is, when the ignition switch is off and any of the spoken instructions is inputted to said microphone;

(f) a second AND gate, one input terminal of which is connected to said fourth AND gate and the other input terminal of which is connected to said controller for ANDing the two input signals and outputting a H-voltage level signal to said third reference pattern memory unit to transfer the reference matrix-phonetic pattern data in said third reference pattern memory unit to said resemblance comparator when the ignition switch is turned on, the transmission system is shifted into NEUTRAL position and any one of the spoken instructions is inputted to said microphone; and (g) a third AND gate, one input terminal of which is connected to said fifth AND gate and the other input terminal of which is connected to said drive position sensor for ANDing the two input signals and outputting a H-voltage level signal to said fourth reference pattern memory unit to transfer the reference matrix-phonetic pattern data in said fourth pattern memory unit to said resemblance comparator when said ignition switch is turned on, the transmission system is shifted into any of 1st DRIVE, 2nd DRIVE and REVERSE positions, and any one of the spoken instructions is inputted to said microphone.

7. A speed recognition system for an automotive vehicle for outputting a plurality of command signals to a plurality of vehicle actuators independently in accordance with spoken instructions as set forth in claim 3, wherein said vehicle-travelling condition detecting means is a speed sensor for generating pulse signals, the frequency of which is proportional to vehicle speed and said speed-dependent speech selection unit comprises:

(a) a frequency-voltage converter connected to said speed sensor for converting the pulse frequency from said speed sensor into a voltage signal representative of vehicle speed and outputting signals corresponding thereto;

(b) a comparator the minus input terminal of which is connected to said f-V converter and to the plus input terminal of which a reference voltage indicative of a reference vehicle speed is applied, said comparator comparing the two input signals thereof and outputting a H-voltage level signal when the voltage signal from said f-V converter drops below the reference voltage;

(c) a transistor the base terminal of which is connected to said comparator and emitter terminal of which is grounded for inverting the voltage signal from said comparator at the collector terminal thereof;

(d) said speech recognizer being directly connected to a first actuator for activating said first actuator, regardless of vehicle speed, when said speech recognizer outputs a H-voltage level signal, that is, when a spoken instruction corresponding to said first actuator is inputted to said microphone;

(e) a first AND gate, one input terminal of which is connected to said comparator and the other input terminal of which is connected to said speech recognizer for ANDing the two input signals and for outputting a signal to said second actuator to activate said second actuator when both said comparator and said speech recognizer output a H-voltage level signal, respectively, that is, when vehicle speed drops below the reference vehicle speed and a spoken instruction corresponding to said second actuator is inputted to said microphone; and (f) a third AND gate, one input terminal of which is connected to said speech recognizer and the other input terminal of which is connected to the collector terminal of said transistor for ANDing the two input signals thereof and outputting a H-voltage level signal to said forth actuator to activate said fourth actuator when both said transistor and said speech recognizer output a H-voltage level signal, respectively, that is, when vehicle speed rises beyond the reference vehicle speed and a spoken instruction corresponding to said fourth actuator is inputted to said microphone.

8. A speech recognition system for an automotive vehicle for outputting a plurality of command signals to a plurality of vehicle actuators independently in accordance with spoken word instructions as set forth in claim 3, wherein said vehicle travelling condition detecting means include an ignition switch sensor for outputting a H-voltage level signal when an ignition switch is turned on and a drive position sensor for outputting a H-voltage level signal when a transmission system is in any of positions 1st DRIVE, 2nd DRIVE and REVERSE positions, and said speed-dependent speech selection unit comprises:

(a) an inverter, the input terminal of which is connected to said ignition switch for inverting the input signal thereof and outputting a H-voltage level signal when the ignition switch is turned off;

(b) a fifth AND gate, one input terminal of which is connected to said ignition switch sensor and the other input terminal of which is connected to said drive position sensor for ANDing the two input signals thereof and outputting a H-voltage level signal when the ignition switch is turned on and the transmission system is shifted into any of 1st DRIVE, 2nd DRIVE and REVERSE positions;

(c) said speech recognizer being directly connected to a first actuator for activating said first actuator, regardless of vehicle speed, when said speech recognizer outputs a H-voltage level signals, that is, when a spoken instruction corresponding to said first actuator is inputted to said microphone;

(d) a first AND gate, one input terminal of which is connected to said inverter and the other input terminal of which is connected to said speech recognizer for ANDing the two input signals and for outputting a signal to said second actuator to activate said second actuator when said inverter and said speech recognizer output a H-voltage level signal, respectively, that is, when vehicle speed is zero and a spoken instruction corresponding to said second actuator is inputted to said microphone; and (e) a third AND gate, one input terminal of which is connected to said speech recognizer and the other input terminal of which is connected to said fifth AND gate for ANDing the two input signals thereof and outputting a H-voltage level signal to said fourth actuator to activate said fourth actuator when both said fifth AND gate and said speech recognizer outputs a H-voltage level signal, respectively, that is, when vehicle speed is not zero and a spoken instruction corresponding to said fourth actuator is inputted to said microphone.

9. A speech recognition system for an automotive vehicle for outputting a plurality of command signals to a plurality of vehicle actuators independently in accordance with spoken word instructions as set forth in claim 4, wherein said vehicle-travelling condition detecting means is a speed sensor for generating pulse signals the frequency of which is proportional to vehicle speed and said speed-dependent speech selection unit comprises:

(a) a frequency-voltage converter connected to said speed sensor for converting the pulse frequency from said speed sensor into a voltage signal representative of vehicle speed and outputting signals corresponding thereto;

(b) a comparator, the minus input terminal of which is connected to said f-V converter and to the plus input terminal of which a reference voltage indicative of a reference vehicle speed is applied, said comparator comparing the two input signals thereof and outputting a H-voltage level signal when the voltage signal from said f-V converter drops belows the reference voltage;

(c) a transistor the base terminal of which is connected to said comparator and the emitter terminal of which is grounded for inverting the voltage signal from said comparator at the collector terminal thereof;

(d) a first microphone being directly connected to said speech recognizer to transmit spoken instruction electric signals transduced by said first microphone to said speech recognizer regardless of vehicle speed;

(e) a first analog switch connected between a second microphone and said speech recognizer, the control terminal of which is connected to said comparator, said first analog switch being turned on to transmit spoken instruction electric signals transduced by said second microphone to said speech recognizer in response to a H-voltage level signal from said comparator, that is, when vehicle speed drops below the reference vehicle speed; and (f) a third analog switch connected between a third microphone and said speech recognizer, the control terminal of which is connected to the collector terminal of said transistor, said third analog switch being turned on to transmit spoken instruction electric signals transduced by said third microphone to said speech recognizer in response to a H-voltage level signal from said transistor, that is, when vehicle speed rises beyond the reference vehicle speed.

10. A speech recognition system for an automotive vehicle for outputting a plurality of command signals to a plurality of vehicle actuators independently in accordance with spoken word instructions as set forth in claim 4, wherein said vehicle travelling condition detecting means include an ignition switch sensor for outputting a H-voltage level signal when an ignition switch is turned on and a drive position sensor for outputting a H-voltage level signal when a transmission system is shifted to any of 1st DRIVE, 2nd DRIVE and REVERSE positions, and said speed-dependent speech selection unit comprises:

(a) an inverter, the input terminal of which is connected to said ignition switch for inverting the input signal thereof and outputting a H-voltage level signal when the ignition switch is turned off;

(b) a fifth AND gate, one input terminal of which is connected to said ignition switch sensor and the other input terminal of which is connected to said drive position sensor for ANDing the two input signals thereof and outputting a H-voltage level signal when the ignition switch is turned on and the transmission system is shifted into any of 1st DRIVE, 2nd DRIVE and REVERSE positions;

(c) a first microphone being directly connected to said speech recognizer to transmit spoken instruction electric signals transduced by said first microphone to said speech recognizer regardless of vehicle speed;

(d) a first analog switch connected between a second microphone and said speech recognizer, the control terminal of which is connected to said inverter, said first analog switch being turned on to transmit spoken instruction electric signals transduced by said second microphone to said speech recognizer in response to a H-voltage level signal from said inverter, that is, when vehicle speed is zero; and (e) a third analog switch connected between a third microphone and said speech recognizer, the control terminal of which is connected to the collector terminal of said transistor, said third analog switch being turned on to transmit spoken instruction electric signals transduced by said third microphone to said speech recognizer in response to a H-voltage level signal from said transistor, that is, when vehicle speed is not zero.

11. A speech recognition system for an automotive vehicle for outputting a plurality of command signals to a plurality of vehicle actuators independently in accordance with spoken instructions as set forth in either claim 5 or 6, wherein said first reference pattern memory unit stores reference matrix-phonetic pattern data for spoken instructions of "Air conditioner on/off", "Radio on/off", "Channel 1, 2, . . . ", and "Window open/close".

12. A speech recognition system for an automotive vehicle for outputting a plurality of command signals to a plurality of vehicle actuators independently in accordance with spoken instructions as set forth in either claim 5 or 6, wherein said second reference pattern memory unit stores reference matrix-phonetic pattern data for spoken instructions of "Door open", and "Trunk lid open".

13. A speech recognition system for an automotive vehicle for outputting a plurality of command signals to a plurality of vehicle actuators independently in accordance with spoken instructions as set forth in either claim 5 or 6, wherein said third reference pattern memory unit stores reference matrix-phonetic pattern data for spoken instruction of "Headlight on/off".

14. A speech recognition system for an automotive vehicle for outputting a plurality of command signals to a plurality of vehicle actuators independently in accordance with spoken instructions as set forth in either claim 5 or 6, wherein said fourth reference pattern memory unit stores reference matrix-phonetic pattern data for spoken instruction of "Headlight high/low beam".

* * * * *